(12) United States Patent
Yoon (10) Patent No.: US 9,499,973 B2
(45) Date of Patent: Nov. 22, 2016

(54) ECOLOGICAL BUILDING AND INSULATION STRUCTURAL BODY THEREOF AND METHOD FOR ASSEMBLING INSULATION STRUCTURAL BODY

(71) Applicant: In Hak Yoon, Yangpyeong-gun (KR)
(72) Inventor: In Hak Yoon, Yangpyeong-gun (KR)
(*) Notice: Subject to any disclaimer, the term of this patent is extended or adjusted under 35 U.S.C. 154(b) by 0 days.

(21) Appl. No.: 14/785,848
(22) PCT Filed: Apr. 22, 2013
(86) PCT No.: PCT/KR2013/003395
§ 371 (c)(1),
(2) Date: Oct. 20, 2015
(87) PCT Pub. No.: WO2014/175473
PCT Pub. Date: Oct. 30, 2014

(65) Prior Publication Data
US 2016/0145859 A1 May 26, 2016

(51) Int. Cl.
*E06B 3/00* (2006.01)
*E04B 1/76* (2006.01)
(Continued)

(52) U.S. Cl.
CPC ............ *E04B 1/7604* (2013.01); *E04B 1/26* (2013.01); *E04B 1/78* (2013.01); *E04B 2/58* (2013.01);
(Continued)

(58) Field of Classification Search
CPC .......... E04B 1/7604; E04B 1/26; E04B 1/78; E04B 2/58; E04B 2001/2672; E04B 2001/745; E04B 2/56; E04B 2/70; E04B 2001/746; E04B 1/76; E04C 2/70; E04C 2/296; E04C 2/38; E04C 2002/3488; E04F 21/085
See application file for complete search history.

(56) References Cited

U.S. PATENT DOCUMENTS 2,268,485 A * 12/1941 Hulbert, Jr. ............... E04B 2/58
52/290
4,177,618 A * 12/1979 Felter ..................... E04F 21/085
52/105
(Continued)

FOREIGN PATENT DOCUMENTS

JP 2006-007694 1/2006
KR 10-2000-0071725 11/2000
(Continued)

OTHER PUBLICATIONS

English translation of 10-2000-0071725.
(Continued)

*Primary Examiner* — Brian Mattei
(74) *Attorney, Agent, or Firm* — Antonia Ha & U.S. Patent, LLC (57) ABSTRACT

The present invention discloses an ecological building which employs an insulation layer filed with an insulation chip made of at least one selected from a group of conifer leaves, rice straws, wheat straws, paper, and a processed product thereof instead of using a conventional inorganic insulation material like a petrochemical foam or mineral wool, and achieves an improvement in both charging and discharging of the insulation chip to be recycled, and an insulation structural body for the building, and a method for assembling the insulation structural body. The insulation structural body is characterized by including: a support member consisting of a plurality of pillar members each having an outer and an inner vertical pillar separated from each other with a given interval by means of a plurality of horizontal ribs alternately arranged on both sides thereof; outer panels joined to the outer vertical pillars of the pillar members of the support member so as to form the outside; inner panels joined to the inner vertical pillars of the pillar members of the support member so as to form the inside; insulation chips filling the space between the outer and the inner panel and the space between the outer and the inner vertical pillar; a discharging plate connected to a discharging opening formed in at least one of the outer panels so as to be opened and closed; and a charging plate connected to a charging opening formed in at least one of the inner panels so as to be opened and closed.

15 Claims, 8 Drawing Sheets

(51) Int. Cl.
*E04C 2/296* (2006.01)
*E04B 1/26* (2006.01)
*E04C 2/38* (2006.01)
*E04B 1/78* (2006.01)
*E04B 2/58* (2006.01)
*E04B 2/70* (2006.01)
*E04B 1/74* (2006.01)
*E04C 2/34* (2006.01)
*E04B 2/74* (2006.01)

(52) U.S. Cl.
CPC .............. *E04B 2/70* (2013.01); *E04C 2/296* (2013.01); *E04C 2/38* (2013.01); *E04B 2/7412* (2013.01); *E04B 2001/2672* (2013.01); *E04B 2001/745* (2013.01); *E04B 2001/746* (2013.01); *E04C 2002/3488* (2013.01)

(56) References Cited

U.S. PATENT DOCUMENTS

| | | | | |
|---|---|---|---|---|
| 5,819,496 | A * | 10/1998 | Sperber | E04B 1/7604 52/404.1 |
| 5,953,883 | A * | 9/1999 | Ojala | E04B 1/26 52/220.1 |
| 6,047,518 | A * | 4/2000 | Lytle | E04F 21/085 156/78 |
| 7,263,810 | B1 * | 9/2007 | Trauba | E04B 1/7604 52/404.1 |
| 8,590,262 | B1 * | 11/2013 | Fluga | E04B 1/26 52/238.1 |
| 2002/0108332 | A1 * | 8/2002 | Timmerman, Sr. | E04B 1/0007 52/293.3 |
| 2010/0319275 | A1 * | 12/2010 | O'Leary | E04B 1/7604 52/173.1 |
| 2013/0081346 | A1 * | 4/2013 | Kulprathipanja | E04B 2/02 52/483.1 |
| 2013/0326977 | A1 * | 12/2013 | Bruner | E04C 2/34 52/274 |
| 2015/0368897 | A1 * | 12/2015 | Beattie | E04B 1/76 52/406.1 |

FOREIGN PATENT DOCUMENTS

| | | |
|---|---|---|
| KR | 10-2003-0059242 | 7/2003 |
| KR | 20-0422478 | 7/2006 |
| KR | 10-2010-0082422 | 7/2010 |

OTHER PUBLICATIONS

English abstract of 2006-007694.
English translation of 20-0422478.
English translation of 10-2003-0059242.
English translation of 10-2010-0082422.

* cited by examiner

ECOLOGICAL BUILDING AND INSULATION STRUCTURAL BODY THEREOF AND METHOD FOR ASSEMBLING INSULATION STRUCTURAL BODY

TECHNICAL FIELD

The present invention relates to an ecological building structure, insulation structure for the same, and method for constructing the insulation structure, and more specifically, to an ecological building structure in which insulation chips including one or more of conifer leaves, rice or wheat straw, paper, and processed products thereof fill secured spaces to form insulation layers that are integrally and continuously configured in floors, walls, and a roof and may be easily drawn in or out, an insulation structure for the same, and a method for constructing such insulation structures in such a manner that they may be assembled.

DISCUSSION OF RELATED ART

Building structures consume about 43% of the entire final energy consumption, of which 85% or more are used for building management, such as hot water, heating or cooling, and cooking.

As such, energy consumption by building structures is higher than that by automobiles and is in a large portion blamable for greenhouse gas emission.

Accordingly, energy saving techniques for building structures may be taken as a core technology to protect natural resources and to address energy crisis.

Existing insulation processes as applied to building structures are generally oriented to the installation of board- or fabric-type insulators. However, such insulation processes may cause substantial energy leakage through the space between walls and the insulators or between boards due to convection or air current, resulting in poor insulation.

Moreover, all existing types of insulators including board- or fabric-type ones may experience a reduction in volume over time or may be sunken down by their own weight, giving rise to an insulation loss or deterioration.

Another issue regarding such conventional construction adopting pre-installed insulators involves difficulties in exchanging, repairing, and re-filling that require the existing building structures to be dismantled.

Existing insulation construction using board- or fabric-type insulators fails to fully fill the insulation space, leaving empty space that creates internal air convection or air current and causing a significant energy loss from the inner or outer side walls and sound diffraction and resonance that negatively affects soundproofing.

The existing construction processes present little or no floor insulation. Floors contribute to about 50% of indoor heat loss due to the foundation usually in contact with the outside.

By known construction processes, roof insulation cannot be attained from the outside, and indoor insulation may cause heat bridges in edge beams that lead to significant energy leaks and resultant dew condensation.

As per the existing construction, insulators are put in between walls. Specifically, according to the existing processes, a wall is typically configured of a 200 mm-thick concrete part, a 300 mm-thick insulator, and a 100 mm-thick brick part, ending up with an overall thickness of 600 mm. Thus, the wall becomes thicker and excessive use of materials arises. Thus, the existing construction may lead to a reduced indoor building area and increased construction costs.

The conventional construction cannot make continuous insulator connections between floors or between walls and floors although able to connect insulators in left and right directions. As a result, a plenty of heat bridges may arise between the floors or between the wall and floor where the insulators are not continuous, resulting in significant energy leaks and resultant deteriorated insulation.

Further, existing insulators are too expensive. As an example, per $m_2$, ready-mixed concrete construction costs about 60 dollars, but the price of Styrofoam insulators is minimally 120 dollars.

For energy savings, ecological buildings ("passive house") have been proposed. In constructing an ecological building in Germany, insulation layers are recommended to be use for 300 mm-thick or more walls, 300 mm-thick or more over-foundation floor, and 300 mm-thick or more roof. The values have been suggested based on insulation layers having a thermal transmittance of 0.15 $w/m^2$ k (or less), outside temperature of −10° C., and indoor temperature of 20° C. For such building structures, a 1.2 $m^2$-sized insulator needs to be used per construction area of 1 $m^2$. As such, ecological buildings, due to the need of more use of expensive insulators and increased expenses in finishing the insulation structure, may suffer from about twice as much construction expense as that of normal building structures, rendering it difficult to be widely put to use.

SUMMARY

The present invention address such issues, and an object of the present invention is to provide an ecological building structure with economical and high insulation capability by forming on an insulation structure an insulation layer using insulation chips including one or more of conifer leaves, rice straw, paper, and processed products thereof and an insulation structure for the same.

Another object of the present invention is to provide a rigid economical building structure in which the supporting member and the board providing a space to fill insulation chips so that an insulation layer is formed therein can withstand lateral force and stress and an insulation structure for the same.

Still another object of the present invention is to provide an ecological building structure in which the spaces in floors, walls, and roof which are filled with inner circumferential surfaces are continuously and integrally formed with each other without gaps to present better insulation and an insulation structure for the same.

Yet still another object of the present invention is to provide an ecological building structure facilitating to fill and remove insulation chips and an insulation structure for the same.

Yet still another object of the present invention is to provide an ecological building structure in which, as insulation chips, particles emitting phytoncides, moisture-adjustable particles, and particles absorbing harmful substances may be selectively used to present functionality, and the insulation chips have a higher fire point for fireproofing and may be recycled as an eco-friendly fertilizer and an insulation structure for the same.

Yet still another object of the present invention is to provide an ecological building structure in which the above-described insulation structures may be installed in a way that they may be assembled to form any one of a wall, floor, and roof, allowing easier construction and a method for constructing insulation structures.

Yet still another object of the present invention is to provide an ecological building structure in which, unlike in the convention construction by which a space is formed between a bearing wall and a wall and an insulator is attached, an insulator fills the space between pillar members so that the thickness of the insulator is the same as the thickness of the overall bearing wall, enabling a sufficient insulation layer to be secured.

Yet still another object of the present invention is to provide an ecological building structure in which an insulator fills the space between plates and between pillars, slimming down the wall. The insulation layer is formed of insulation chips, enabling better insulation.

Yet still another object of the present invention is to enable energy loss-free, complete insulation by allowing for horizontal and vertical floor-to-floor connections and wall-to-floor or wall-to-roof connections to provide the insulation layers in the insulation structure that are continuously and integrally connected with each other, unlike in the prior art.

Yet still another object of the present invention is to provide insulation layers that prevent sound diffraction and resonance, thereby leading to enhanced inter-room soundproofing.

To achieve the above objects, according to the present invention, an insulation structure for an ecological building structure comprises a supporting member including a plurality of pillar members spaced apart from each other at a predetermined interval, each pillar member having an outer vertical pillar and an inner vertical pillar spaced apart from each other and a plurality of horizontal ribs alternately provided to the outer vertical pillar and the inner vertical pillar to keep the outer vertical pillar and the inner vertical pillar spaced apart; outer panels attached to the outer vertical pillars forming each pillar member of the supporting member to form an outside; inner panels attached to the inner vertical pillars forming each pillar member of the supporting member to form an inside; insulation chips filling spaces between the outer panels and the inner panels and spaces between the outer vertical pillars and inner vertical pillars of the pillar members; a discharging plate attached to a discharging opening formed in one or more of the outer panels and configured to be opened or closed; and a charging plate attached to a charging opening formed in one or more of the inner panels and configured to be opened or closed.

Here, the outer vertical pillars and the inner vertical pillars may be formed of any one of timber or steel.

The plurality of horizontal ribs may be formed in a trust structure between the outer vertical pillars and the inner vertical pillars.

An interval between the outer panels and the inner panels may be set to 250 mm when a temperature gap between a target indoor temperature (20° C.) and a lowest mean temperature is 25° C. or less, 300 mm when the temperature gap exceeds 25° C. and not more than 30° C., 400 mm when the temperature gap exceeds 30° C. and not more than 40° C., and 500 mm when the temperature gap exceeds 40° C. and 50° C. or less.

It is preferable that the spaces between the outer panels and the inner panels are connected through spaces between the outer vertical pillars and the inner vertical pillars forming the pillar members, and thus, an insulation layer formed by the filling of the insulation chips is connected continuously.

The insulation chips may include one or more of conifer leaves, rice straw, wheat straw, paper, and processed products thereof, each insulation chip being of a particle with a thickness of 1 mm or more and 3 mm or less and a length of 1 mm or more and 20 mm or less.

The insulation chips may include one or more of particles emitting phytoncides, particles having a function to adjust moisture, and particles having a function to absorb harmful materials.

It is preferable that the insulation chips include particles having a fire point of 460° C. or more.

The insulation chips may be formed of a material that is recyclable as an eco-friendly fertilizer.

The charging plate may have a window through which the insulation chips filling may be observed. The window may be formed of a transparent plate with through holes.

An assembly of the pillar members, inner panels, and outer panels may be configured to form any one of a wall, floor, and roof.

Meanwhile, according to the present invention, a method for constructing an insulation structure for an ecological building structure may comprise forming a pillar member by spacing apart from each other an outer vertical pillar and an inner vertical pillar formed of any one of timber or steel and alternately providing a plurality of horizontal ribs to the outer vertical pillar and the inner vertical pillar to keep the outer vertical pillar and the inner vertical pillar spaced apart; arranging a plurality of pillar members to be spaced apart from each other at a predetermined interval; forming an outside by attaching outer panels to the outer vertical pillars forming each pillar member; forming an inside by attaching inner panels to the inner vertical pillars forming each pillar member; installing assemblies of the pillar members, the outer panels, and the inner panels in such a manner that they fit together to form any one of a wall, a floor, and a roof; and opening a charging plate that is attached to a charging opening formed in one or more of the charging plates to be opened or closed and filling, with insulation chips, spaces between the outer panels and the inner panels and spaces between the outer vertical pillars and inner vertical pillars of the pillar members.

The plurality of horizontal ribs may be installed in a trust structure between the outer vertical pillars and the inner vertical pillars.

The outer panels and the inner panels may be spaced apart from each other at 250 mm when a temperature gap between a target indoor temperature (20° C.) and a lowest mean temperature is 25° C. or less, at 300 mm when the temperature gap exceeds 25° C. and not more than 30° C. at 400 mm when the temperature gap exceeds 30° C. and not more than 40° C., and at 500 mm when the temperature gap exceeds 40° C. and 50° C. or less.

Therefore, according to the present invention, an insulation layer using insulation chips including one or more of conifer leaves, rice or wheat straw, paper and processed products thereof is applied to an insulation structure, presenting better economic benefits. Further, minimized thermal energy leakage and higher insulation capability may be achieved by the nature of the material and thanks to the insulation layers of the wall, floor, and roof that are continuously and integrally formed with each other without any joins in vertical and horizontal directions.

According to the present invention, the plates and supporting members forming insulation spaces are securely joined together, presenting a structure robust to bending, lateral force, and stress and with an enhanced seismic capability.

According to the present invention, the insulation chips may be easily filled or removed, and insulation chips removed, may be recycled as an eco-friendly fertilizer.

According to the present invention, the insulation chips may come up with various functionality, such as emission of phytoncides, moisture adjustment, absorption of harmful substances, and fireproofing.

Further, the insulation structures may be installed in such a manner they fit together to form any one of a wall, floor, and roof.

According to the present invention, unlike in the convention construction by which a space is formed between a bearing wall and a wall and an insulator is attached, an insulator fills the space between pillar members so that the thickness of the insulator is the same as the thickness of the overall bearing wall, enabling a sufficient insulation layer to be secured.

According to the present invention, an insulator fills the space between plates and between, pillars, slimming down the wall. The insulation layer is formed of insulation chips, enabling better insulation.

According to the present invention, the insulation layers may be connected horizontally, vertically between floors, and between walls and floors, preventing sound diffraction and resonance and resultantly leading to better soundproofing.

DETAILED DESCRIPTION OF EXEMPLARY EMBODIMENTS

Hereinafter, embodiments of the present invention are described in detail with reference to the accompanying drawings. The terms used herein should be interpreted not in typical or dictionary definitions but to comply in concept with the technical matters of the present invention.

The configurations disclosed in the specification and the drawings are mere examples and do not overall represent the technical spirit of the present invention. Therefore, various changes may be made thereto, and equivalents thereof also belong to the scope of the present invention.

Figure 1:
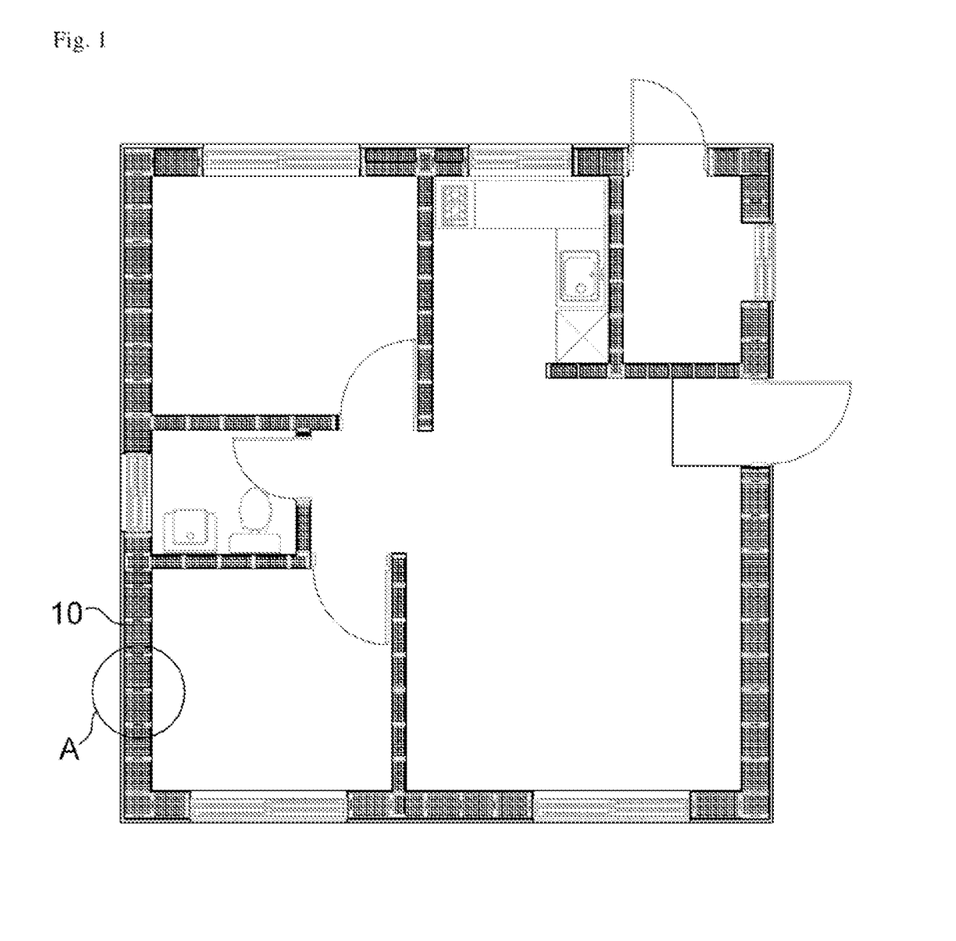
FIG. 1 is a plan view illustrating an ecological building to which an embodiment of the present invention applies.

According to the present invention, the ecological building structure may be applied as shown in FIG. 1, and insulation structures according to the present invention may be applied to walls.

Figure 2:
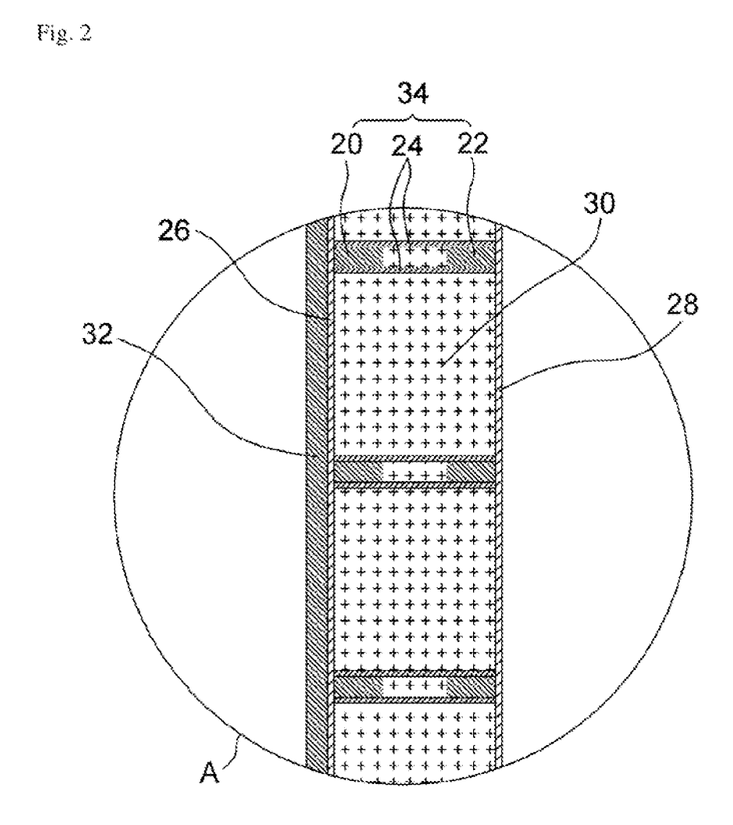
FIG. 2 is an enlarged view of portion A of FIG. 1.

In other words, an embodiment of the present invention may apply to a wall 10 of the ecological building structure as shown in FIG. 1. As shown in FIG. 2, the wall 10 includes outer vertical pillars 20, inner vertical pillars 22, horizontal ribs 24 connecting the outer vertical pillars 20 with the inner vertical pillars 22, an outer panel 26 installed on the outer vertical pillars 20, and inner panel 28 installed on the inner vertical pillars 22, and insulation chips 30 filling spaces between the outer panel 26 and the inner panel 28 and spaces between the outer vertical pillars 20 and the inner vertical pillars 22 to form an insulation layer. A finishing material 32 may be installed on the outer panel 26. Here, the assembly of an outer vertical pillar 20, an inner vertical pillar 22, and horizontal ribs 24 forms a pillar member 34. Multiple pillar members 34 spaced apart from each other form a supporting member.

Figure 3:
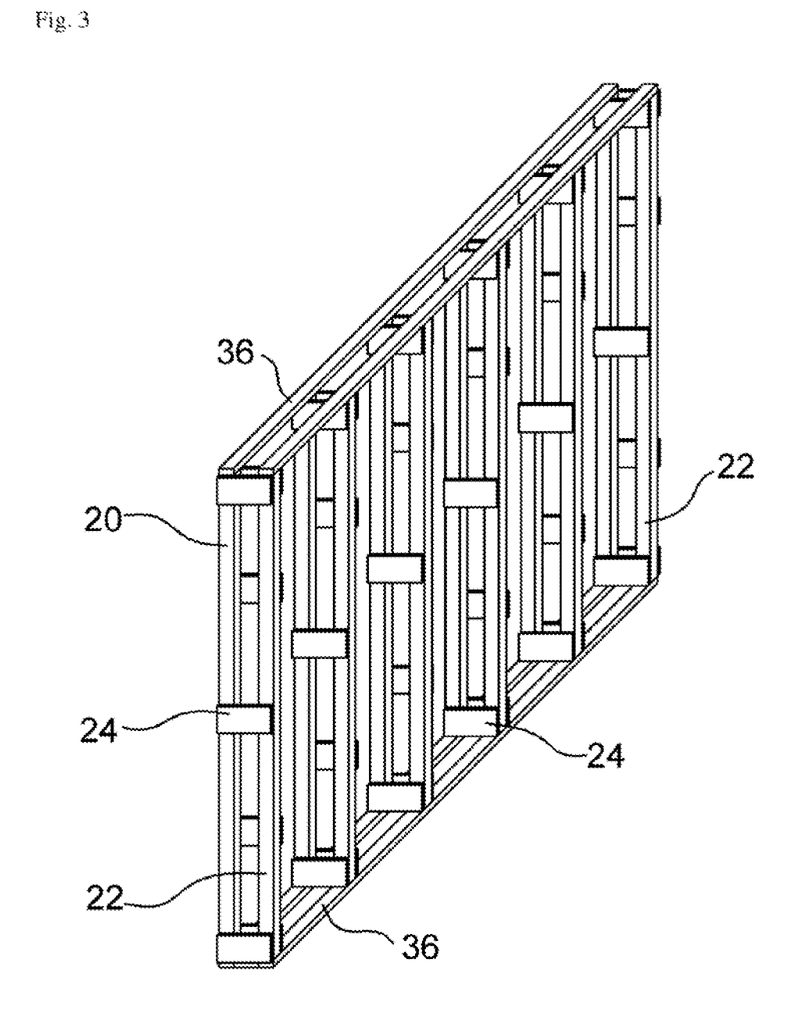
FIG. 3 is a perspective view illustrating a supporting member to form an insulation structure.

The configuration of a supporting member is described in detail with reference to FIGS. 2 and 3.

In the multiple pillar members 34 forming a supporting member, the outer vertical pillars 20 and the inner vertical pillars 22 spaced apart from each other to form spaces for achieving an insulation layer and such spacing is maintained by multiple horizontal ribs 24 that are alternately attached to both the outer vertical pillars 20 and the inner vertical pillars 22.

Here, the horizontal ribs 24 couple the outer vertical pillars 20 with the inner vertical pillars 22, forming the pillar members 34 subject to lateral force and stress. The lateral force and stress applied to the outer vertical pillars 20 and the inner vertical pillars 22 may be dispersed through the horizontal ribs 24.

The horizontal ribs 24 may be arranged between the outer vertical pillars 20 and the inner vertical pillars 22 in a zig-zag manner or in a trust structure, or in other various patterns as intended by the manufacturer. Here, the term "trust structure" means a structure in which steels or timbers are woven in a net shape to withstand load. Adoption of trust-structural horizontal ribs 24 in the pillar members 34 may increase stability against lateral force and stress.

The outer vertical pillars 20 and the inner vertical pillars 22 may be formed of limbers or steels, and the horizontal ribs 24 connecting therebetween may also be formed of timbers or iron materials depending on the materials used for the outer vertical pillars 20 and the inner vertical pillars 22.

The multiple pillar members 34 spaced apart from each other may be fixed by horizontal cross beams 36 attached to the top and bottom thereof.

The horizontal cross beams 36 may also be formed of timbers or steels depending on the materials used for the outer vertical pillars 20 and the inner vertical pillars 22.

As described above, spaces may be formed between the horizontal cross beams 36, and the spaces may be used to connect insulators when the insulators need to be connected between an upper floor and its lower floor.

Figure 4:
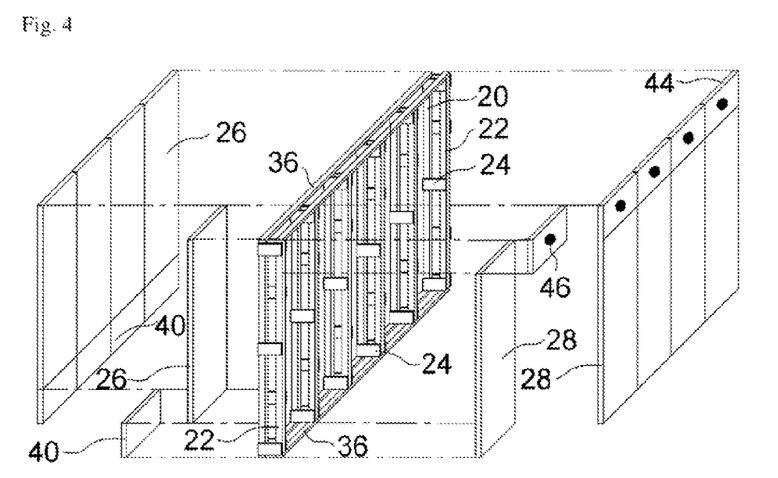
FIG. 4 is an exploded view illustrating a state in which an inner panel, an outer panel, a discharging plate, and a charging plate are assembled in a supporting member.
Figure 5:
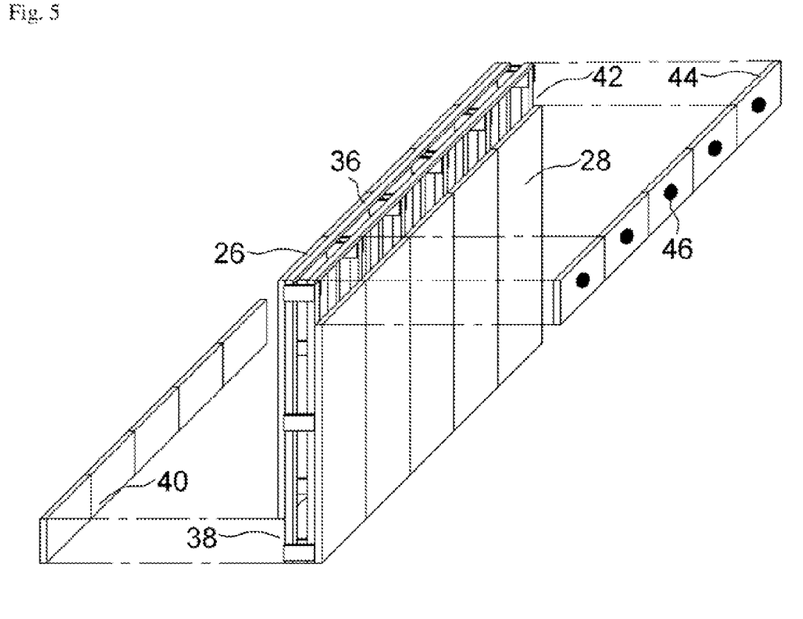
FIG. 5 is an exploded view illustrating a state in which a discharging plate and a charging plate are assembled, with an inner panel and an outer panel assembled in a supporting member.
Figure 6:
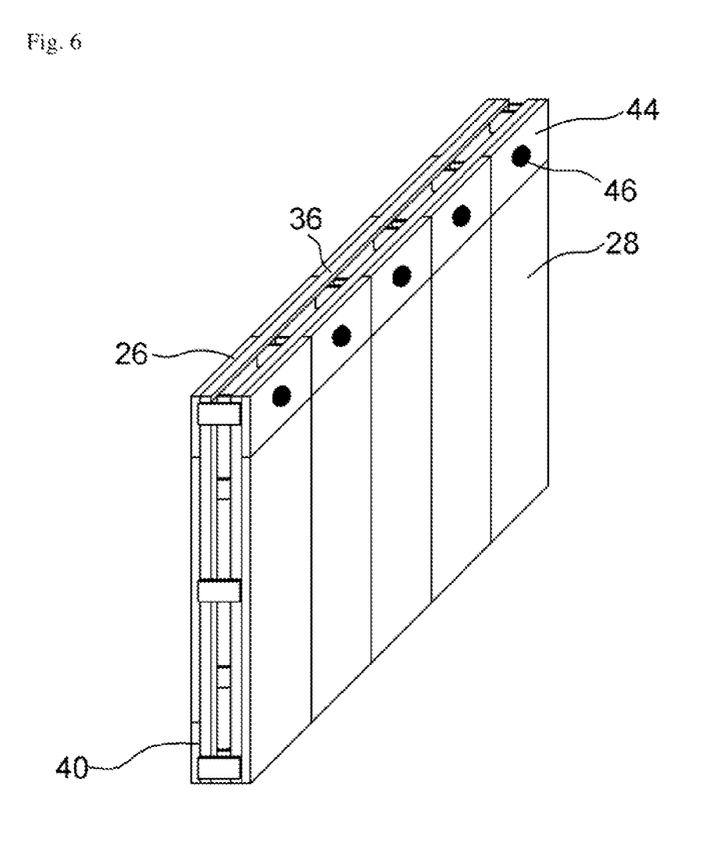
FIG. 6 is a perspective view illustrating a state in which an inner panel, an outer panel a discharging plate, and a charging plate are in assembled.

Meanwhile, the supporting member configured as described above in connection with FIG. 3 is coupled to outer panels 26, inner panels 28, a discharging plate 40, and an interconnect port 44 as shown in FIGS. 4 to 6.

In other words, the outer panels 26 are coupled to the outer vertical pillars 20 to form an outside, and the inner panels 28 are coupled to the inner vertical pillars 20 to form an inside.

The outer panel 26 may be designed to have various widths so as to overlap two or more outer vertical pillars 20, and the inner panel 26 may be designed to have various widths so as to overlap two or more inner vertical pillars 22.

The outer panel 26 and the inner panel 28 may be formed of plywood. In particular, the inner panel 28 may be formed of water-resistant plywood and may have a moisture-proof paper sheet attached thereon. The finishing material 32 may be attached to the outer panel 26. A fire-proof plaster board or larch louvre may be used as the finishing material 32.

A discharging opening 38 may be formed at a lower portion of the outer panel 26, and the discharging plate 40 that may open or close may be provided to the discharging opening 38.

A charging opening 42 may be formed at an upper portion of the inner panel 28, and the charging plate 44 that may open or close may be provided to the charging opening 42.

Here, the discharging opening 38 and the charging opening 42 may be formed in all or some of the multiple outer panels 26. The discharging plate 40 and the charging plate 44 may be formed of plywood. The outer panel 40 and the inner panel 44 may be configured to be repeatedly opened or closed, e.g., by screwing the outer vertical pillars 20 with the inner vertical pillars 22.

The charging plate 44 may have a window 46 that allows for observation of insulation chips 30 filling. The window 46 may be formed of a transparent plate with through holes. Here, the window 46 may have a diameter of about 100 mm. The window 46 may be formed in the whole or part of the charging plate 44 and may allow the insulation chips 30 subsiding therein to be observed at naked eyes while drawing in or out moisture. In particular, in the case where the insulation chips 30 contain particles emitting phytoncides, the phytoncides may be emitted through the through holes of the window 46.

As set forth above, the outer panels 26, the inner panels 28, the discharging plate 40, and the charging plate 44 attached to the outer vertical pillars 20 and the inner vertical pillars 20 of the supporting member may be arranged and assembled as shown in FIG. 4, or the discharging plate 40 and the charging plate 44 may be attached after the outer panel 26 and the inner panel 28 have been assembled as shown in FIG. 5.

The outer panels 26 and the inner panels 28 are spaced apart from each other by the pillar members 34 including the outer vertical pillars 20 and the inner vertical pillars 22. In each pillar member 34, the outer vertical pillars 20 and the inner vertical pillars 22 are spaced apart from each other.

Figure 7:
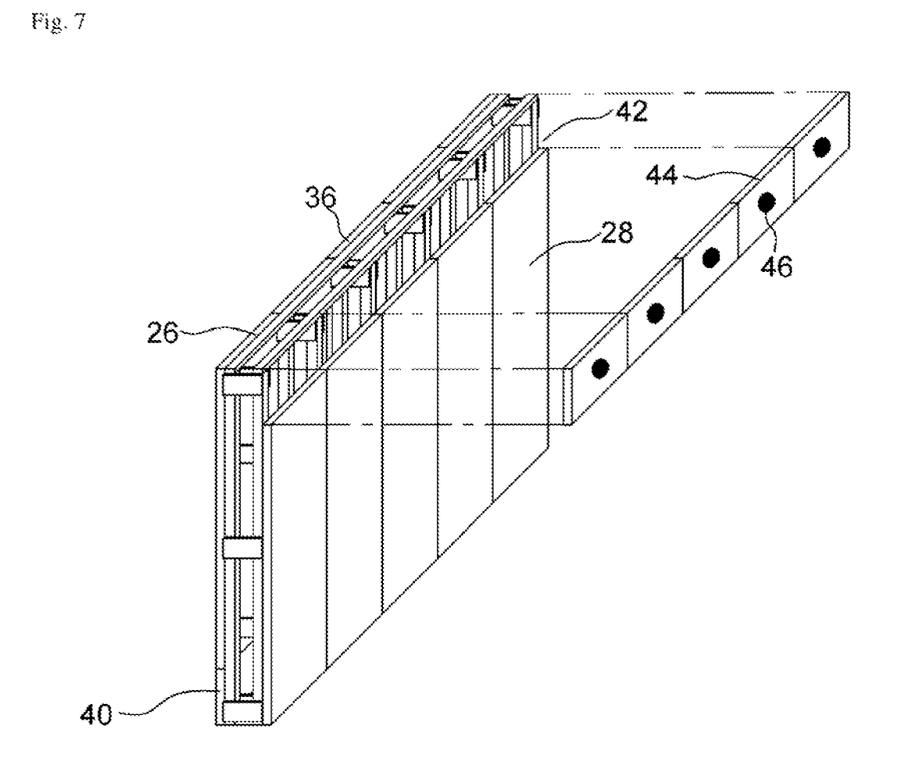
FIG. 7 is a view illustrating putting in insulation chips.

Insulation chips 30 fill the spaces. As shown in FIG. 7, the charging plate 44 may be detached to allow the insulation chips 30 to fill with the charging opening 42 opened.

Figure 8:
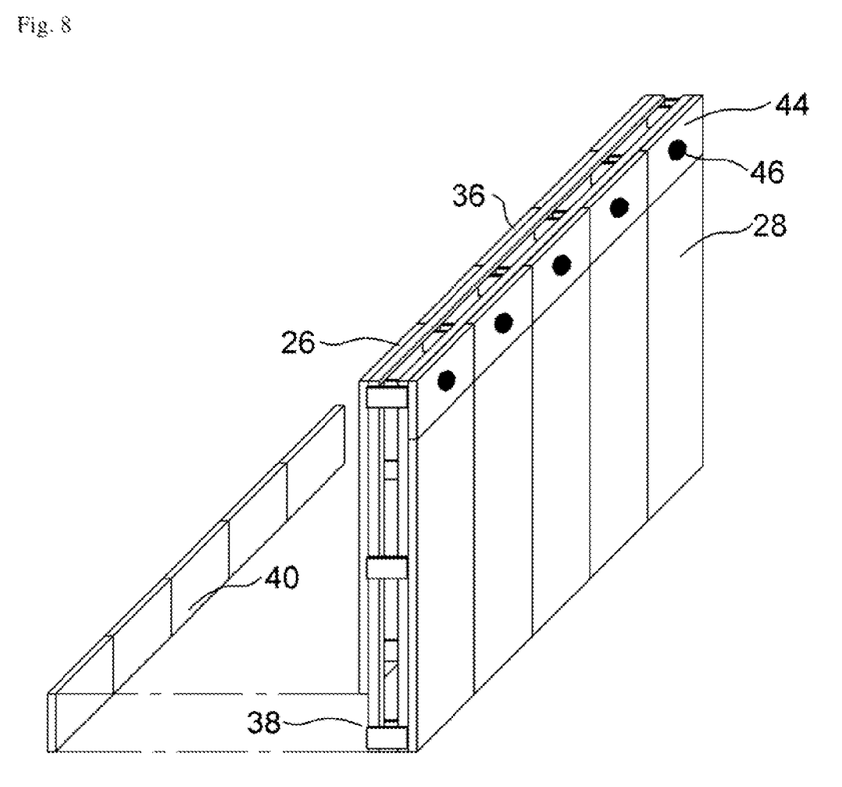
FIG. 8 is a view illustrating removing insulation chips.

The filling insulation chips 30 may subside over time, deteriorating the insulation capability. Further, after a predetermined time of use, the insulation chips 30 need to be removed. In such case, the discharging plate 40 may be removed as shown in FIG. 8, so that the insulation chips 30 may be drawn out with the discharging opening 38 is opened.

As such, according to the present invention, the insulation structure enables exchange, repair, and refill of insulation chips 30, which can be easily done manually or by mechanical equipment, allowing for easier maintenance.

Meanwhile, the thickness of the insulation layer formed by the filling insulation chips 30 may be determined by an indoor-outdoor temperature gap and the thermal transmittance of particle-phase insulators, and accordingly, the insulation structure according to the present invention may have a variable thickness.

More specifically, the spacing between the outer panels 26 and the inner panels 28 to form the insulation layer may be set to 250 mm in case the temperature gap between a target indoor temperature (20° C.) and a lowest mean temperature is 25° C. or less, 300 mm in case the temperature gap exceeds 25° C. and not more than 30° C., 400 mm in case the temperature gap exceeds 30° C. and not more than 40° C., and 500 mm in case the temperature gap exceeds 40° C. and 50° C. or less. Even when the temperature gap between the target indoor temperature and the lowest mean temperature is over 50° C., the spacing between the outer panels 26 and the inner panels 28 may be set to 500 mm or more considering insulation.

As described above, according to an embodiment of the present invention, the spaces between the outer panels 26 and the inner panels 28 are connected through the spaces between the outer vertical pillars 20 and the inner vertical pillars 22 forming the pillar members, so that the insulation layers formed by the filling of the insulation chips 30 may be configured to be continuous to one another. Thus, the conventional issue that insulation capability deteriorates due to inter-insulator joins may be addressed.

According to an embodiment of the present invention, the insulation chips 30 may include one or more of conifer leaves, rice straw, wheat straw, paper, and processed products thereof. Each insulation chip 30 may be of a particle with a thickness of 1 mm or more and 3 mm or less and a length of 1 mm or more and 20 mm or less.

The insulation chips 30 may contain particles that emit phytoncides or suck up harmful material like those of conifers or particles that may adjust moisture like those of timbers, rice or wheat straw, and paper.

Insulators generally in use are formed of petrochemicals or inorganic materials, emit a significant amount of carbon dioxide while consuming enormous energy upon manufacture, and is a cause of serious environmental contamination as wasted.

The insulation chips 30 according to the present invention are formed of eco-friendly materials, such as conifer leaves, rice or wheat straw, paper, and processed products, and absorb and store, rather than emitting, carbon dioxide.

The insulation chips 30 according to the present invention may create and emit phytoncides to adjust moisture or absorb harmful materials, preventing atopy or asthma.

The insulation chips 30 according to the present invention, by the nature of the materials used, has a lower fire point of 460° C. that is 2.5 times as high as the fire point, 180° C., of the foam insulator typically used, preventing fire, and do not discharge toxic gases in fire, reducing life damage.

Since the insulation chips 30 according to the present invention are formed of conifer leaves, rice or wheat straw, paper, and produced products thereof that are eco-friendly and recyclable, their waste may be recycled as eco-friendly fertilizer, preventing pollution or other environmental issues.

Since the insulation chips 30 according to the present invention are formed of conifer leaves, rice or wheat straw, paper, and produced products thereof, the insulation structure may be provided at a tower price, enabling cost savings in construction thereof.

Figure 9:
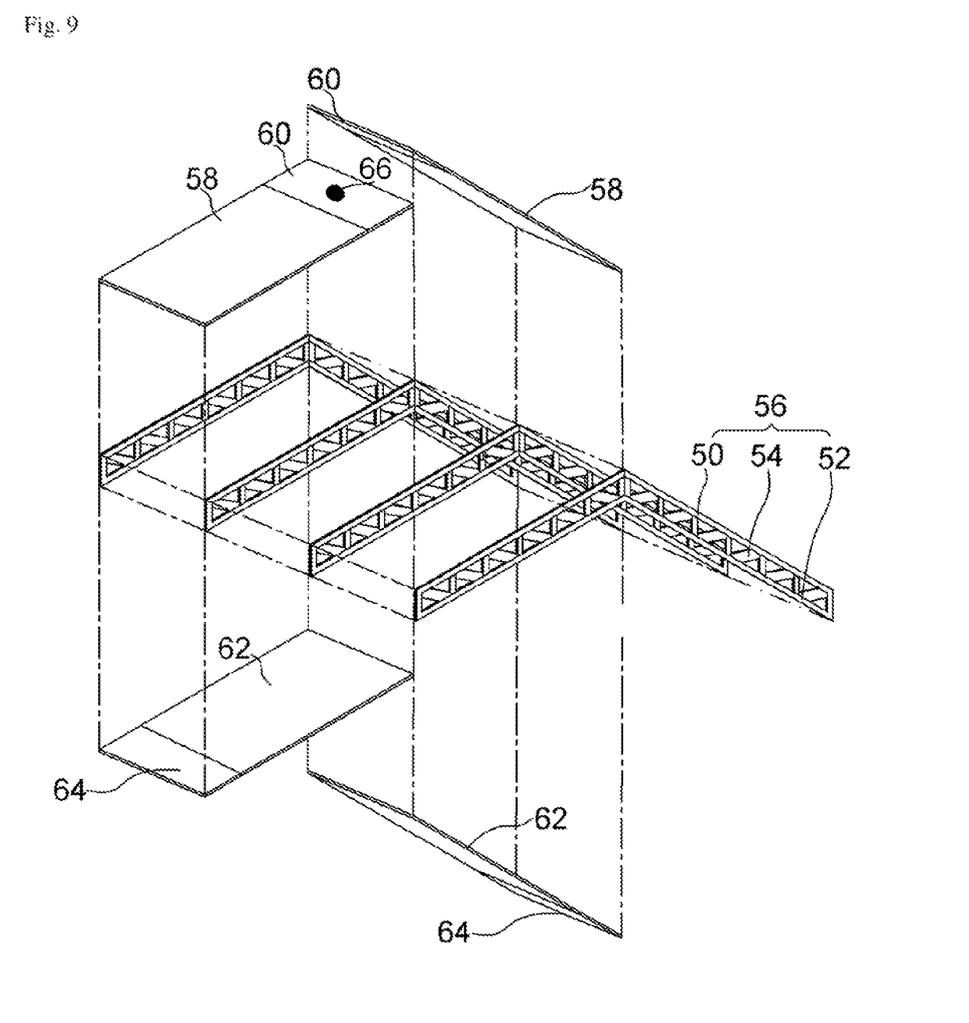
FIG. 9 is an exploded view illustrating an example in which an insulation structure applies to a roof according to an embodiment of the present invention.

Although an example in which the insulation structure is applied to walls has been described above in connection with FIGS. 1 to 8, the insulation structure may also be applied to roofs or floors as shown in FIG. 9.

Referring to FIG. 9, outer pillars 50 and inner pillars 52 are coupled by trust-structural ribs 54 to form pillar members 56. Outer panels 58 and charging plates 60 are attached to the top of supporting members in which multiple pillar members 56 are arranged to be spaced apart from each other, and charging plates 62 and discharging plates 64 are attached to the bottom of the supporting members. Insulators fill the spaces between the outer panels 58 and the inner panels 62 and between the pillar members 56. In this case, the discharging plates 64 may be formed in the outer panels 58, and the charging plates 60 may be formed in the inner panels 62 as intended by the manufacturer. A window 66 may be formed in a charging plate 60.

Meanwhile, according to an embodiment of the present invention, the assemblies of the pillar members, inner panels, and outer panels may be installed and constructed in such a manner they fit together to form any one of a wall, floor, and roof.

In other words, according to the present invention, a construction method may include forming a pillar member 34 by spacing apart from each other an outer vertical pillar 20 and an inner vertical pillar 22 formed of any one of timber or steel and alternately providing a plurality of horizontal ribs 24 to the outer vertical pillar 20 and the inner vertical pillar 22 to keep the outer vertical pillar 20 and the inner vertical pillar 22 spaced apart, arranging a plurality of pillar members 34 to be spaced apart from each other at a predetermined interval, forming an outside by attaching outer panels 26 to the outer vertical pillars 20 forming each pillar member 34, forming an inside by attaching inner panels 28 to the inner vertical pillars 22 forming each pillar member 34, installing assemblies of the pillar members 34, the outer panels 26, and the inner panels 28 in such a manner that they fit together to form any one of a wall, a floor, and a roof, and opening a charging plate 44 that is attached to a charging opening 42 formed in one or more of the inner panels 28 to be opened or closed and filling, with insulation chips, spaces between the outer panels 26 and the inner panels 28 of the structure and spaces between the outer vertical, pillars 20 and inner vertical pillars 22 of the pillar members 34.

Since insulation structures according to the present invention may be constructed in such a way that they may be assembled, an enhancement in construction may be achieved in applying the insulation structures to any one of a wall, floor, and roof.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. An insulation structure for an ecological building structure, the insulation structure comprising:
   a supporting member including a plurality of pillar members spaced apart from each other at a predetermined interval, each pillar member having an outer vertical pillar and an inner vertical pillar spaced apart from each other and a plurality of horizontal ribs alternately provided to the outer vertical pillar and the inner vertical pillar to keep the outer vertical pillar and the inner vertical pillar spaced apart; outer panels attached to the outer vertical pillars forming each pillar member of the supporting member to form an outside;
   inner panels attached to the inner vertical pillars forming each pillar member of the supporting member to form an inside;
   insulation chips filling spaces between the outer panels and the toner panels and spaces between the outer vertical pillars and inner vertical pillars of the pillar members;
   a discharging plate attached to a discharging opening formed in one or more of the outer panels and configured to be opened or closed; and
   a charging plate attached to a charging opening formed in one or more of the inner panels and configured to be opened or closed.

2. The insulation structure of claim 1, wherein the outer vertical pillars and the inner vertical pillars are formed of any one of timber or steel.

3. The insulation structure of claim 1, wherein the plurality of horizontal ribs are formed in a trust structure between the outer vertical pillars and the inner vertical pillars.

4. The insulation structure of claim 1, wherein an interval between the outer panels and the inner panels is set to 250 mm when a temperature gap between a target indoor temperature and a lowest mean temperature is 25° C. or less, 300 mm when the temperature gap exceeds 25° C. and not more than 30° C., 400 mm when the temperature gap exceeds 30° C. and not more than 40° C., and 500 mm when the temperature gap exceeds 40° C. and 50° C. or less.

5. The insulation structure of claim 1, wherein the spaces between the outer panels and the inner panels are connected through spaces between the outer vertical pillars and the inner vertical pillars forming the pillar members, and thus, an insulation layer formed by the filling of the insulation chips is connected continuously.

6. The insulation structure of claim 1, wherein the insulation chips include one or more of conifer leaves, rice straw, wheat straw, paper, and processed products thereof, each insulation chip being of a particle with a thickness of 1 mm or more and 3 mm or less and a length of 1 mm or more and 20 mm or less.

7. The insulation structure of claim 1, wherein the insulation chips include one or more of particles emitting phytoncides, particles having a function to adjust moisture, and particles having a function to absorb harmful materials.

8. The insulation structure of claim 1, wherein the insulation chips include particles having a fire point of 460° C. or more.

9. The insulation structure of claim 1, wherein the insulation chips are formed of a material that may be recycled as an eco-friendly fertilizer.

10. The insulation structure of claim 1, wherein the charging plate includes a window through which the insulation chips tilling may be observed.

11. The insulation structure of claim 10, wherein the window is formed of a transparent plate having through holes.

12. An ecological building structure in which at least one or more of a wall, a floor, and a roof include the insulation structure of claim 1.

13. A method for constructing an insulation structure for an ecological building structure, the method comprising:
   forming a pillar member by spacing apart from each other an outer vertical pillar and an inner vertical pillar formed of any one of timber or steel and alternately providing a plurality of horizontal ribs to the outer vertical pillar and the inner vertical pillar to keep the outer vertical pillar and the inner vertical pillar spaced apart;

arranging a plurality of pillar members to be spaced apart from each other at a predetermined interval; forming an outside by attaching outer panels to the outer vertical pillars forming each pillar member;

forming an inside by attaching inner panels to the inner vertical pillars forming each pillar member;

installing assemblies of the pillar members, the outer panels, and the inner panels in such a manner that they fit together to form any one of a wall, a floor, and a roof;

opening a charging plate that is attached to a charging opening formed in one or more of the inner panels to be opened or closed and filling, with insulation chips, spaces between the outer panels and the inner panels and spaces of the structure between the outer vertical pillars and inner vertical pillars of the pillar members; and opening a discharging plate that is attached to a discharging opening formed in one or more of the outer panels to be opened or closed.

14. The method of claim 13, wherein the plurality of horizontal ribs are installed in a truss structure between the outer vertical pillars and the inner vertical pillars.

15. The method of claim 13, wherein the outer panels and the inner panels are spaced apart from each other at 250 mm when a temperature gap between a target indoor temperature and a lowest mean temperature is 25° C. or less, at 300 mm when the temperature gap exceeds 25° C. and not more than 30° C., at 400 mm when the temperature gap exceeds 30° C. and not more than 40° C., and at 500 mm when the temperature gap exceeds 40° C. and 50° C. or less.

* * * * *